(12) United States Patent
Ohara

(10) Patent No.: US 8,867,071 B2
(45) Date of Patent: Oct. 21, 2014

(54) PRINTER FOR REQUIRING TERMINAL DEVICE TO SUPPLY TARGET DATA AND TERMINAL DEVICE FOR SUPPLYING TARGET DATA IN RESPONSE TO REQUIREMENT FROM PRINTER

(75) Inventor: Kiyotaka Ohara, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 158 days.

(21) Appl. No.: 13/052,860

(22) Filed: Mar. 21, 2011

(65) Prior Publication Data

US 2011/0235113 A1 Sep. 29, 2011

(30) Foreign Application Priority Data

Mar. 24, 2010 (JP) ................... 2010-067689

(51) Int. Cl.
*G06F 3/12* (2006.01)
*G06F 3/00* (2006.01)

(52) U.S. Cl.
CPC ............ *G06F 3/1288* (2013.01); *G06F 3/1205* (2013.01); *G06F 3/1237* (2013.01)
USPC .............................................. 358/1.15; 710/9

(58) Field of Classification Search
USPC ................ 358/1.13, 1.15; 709/223, 204, 203, 709/219–222; 715/273, 274, 738
See application file for complete search history.

(56) References Cited

U.S. PATENT DOCUMENTS

| | | | | |
|---|---|---|---|---|
| 6,070,185 A * | 5/2000 | Anupam et al. | ............ | 709/204 |
| 7,219,168 B2 * | 5/2007 | Koss | ............... | 710/16 |
| 7,490,139 B2 * | 2/2009 | Deno et al. | .................... | 709/219 |
| 7,773,248 B2 * | 8/2010 | Kadota | ........................ | 358/1.16 |
| 2004/0008372 A1 * | 1/2004 | Akashi et al. | ................ | 358/1.15 |
| 2005/0111856 A1 | 5/2005 | Kawai | | |
| 2005/0267797 A1 | 12/2005 | Takahashi et al. | | |
| 2006/0061805 A1 * | 3/2006 | Kawamura | .................... | 358/1.15 |
| 2006/0158674 A1 * | 7/2006 | Mizoguchi | ................... | 358/1.13 |
| 2008/0021991 A1 * | 1/2008 | Kawai | ........................... | 709/223 |
| 2008/0094659 A1 * | 4/2008 | Ito | ............................... | 358/1.15 |
| 2008/0259395 A1 * | 10/2008 | Mori | ........................... | 358/1.15 |

(Continued)

FOREIGN PATENT DOCUMENTS

EP 0872792 * 10/1998 ............... G06F 3/12
EP 0872792 A2 10/1998

(Continued)

OTHER PUBLICATIONS

Japan Patent Office, Notification of Reasons for Rejection for Japanese Patent Application No. 2010-067689 (counterpart Japanese patent application), mailed Jul. 17, 2012.

(Continued)

*Primary Examiner* — Barbara Reinier

(74) *Attorney, Agent, or Firm* — Merchant & Gould PC

(57) ABSTRACT

A printer may supply print instruction screen data to a terminal device. The terminal device may supply selection information to the printer in a case where an instruction button in the print instruction screen is selected by a user. The printer may make, in a case where the selection information is obtained from the terminal device, a requirement requiring the terminal device to supply target data of a print target. The terminal device may supply the target data in accordance with the requirement. The printer may print an image represented by the target data.

12 Claims, 7 Drawing Sheets

(56) References Cited

U.S. PATENT DOCUMENTS

| | | | |
|---|---|---|---|
| 2008/0297829 A1* | 12/2008 | Paek | 358/1.15 |
| 2009/0313541 A1* | 12/2009 | Dan | 715/273 |
| 2010/0141992 A1* | 6/2010 | Murase | 358/1.15 |

FOREIGN PATENT DOCUMENTS

| | | |
|---|---|---|
| EP | 1102159 A2 | 5/2001 |
| JP | H11-316658 A | 11/1999 |
| JP | 2000-181657 A | 6/2000 |
| JP | 2000-293324 A | 10/2000 |
| JP | 2004-213692 A | 7/2004 |
| JP | 2005-128890 A | 5/2005 |
| JP | 2005-346180 A | 12/2005 |
| JP | 2006-195831 A | 7/2006 |
| JP | 2008-152545 A | 7/2008 |
| JP | 2009-087164 A | 4/2009 |
| JP | 2009-274350 A | 11/2009 |

OTHER PUBLICATIONS

European Patent Office, Extended European Search Report for European Patent Application No. 11156646.9, mailed Apr. 24, 2013.

European Patent Office, Extended European Search Report for European Patent Application No. 11156646.9 (counterpart to above-captioned patent application), mailed Apr. 24, 2013.

David Philip Oster, "Server Side Cookies", Jul. 23, 2007, XP055059198, Retrieved from the Internet on Apr. 11, 2013, http://www.turbozen.com/howto/serversidecookies/.

* cited by examiner

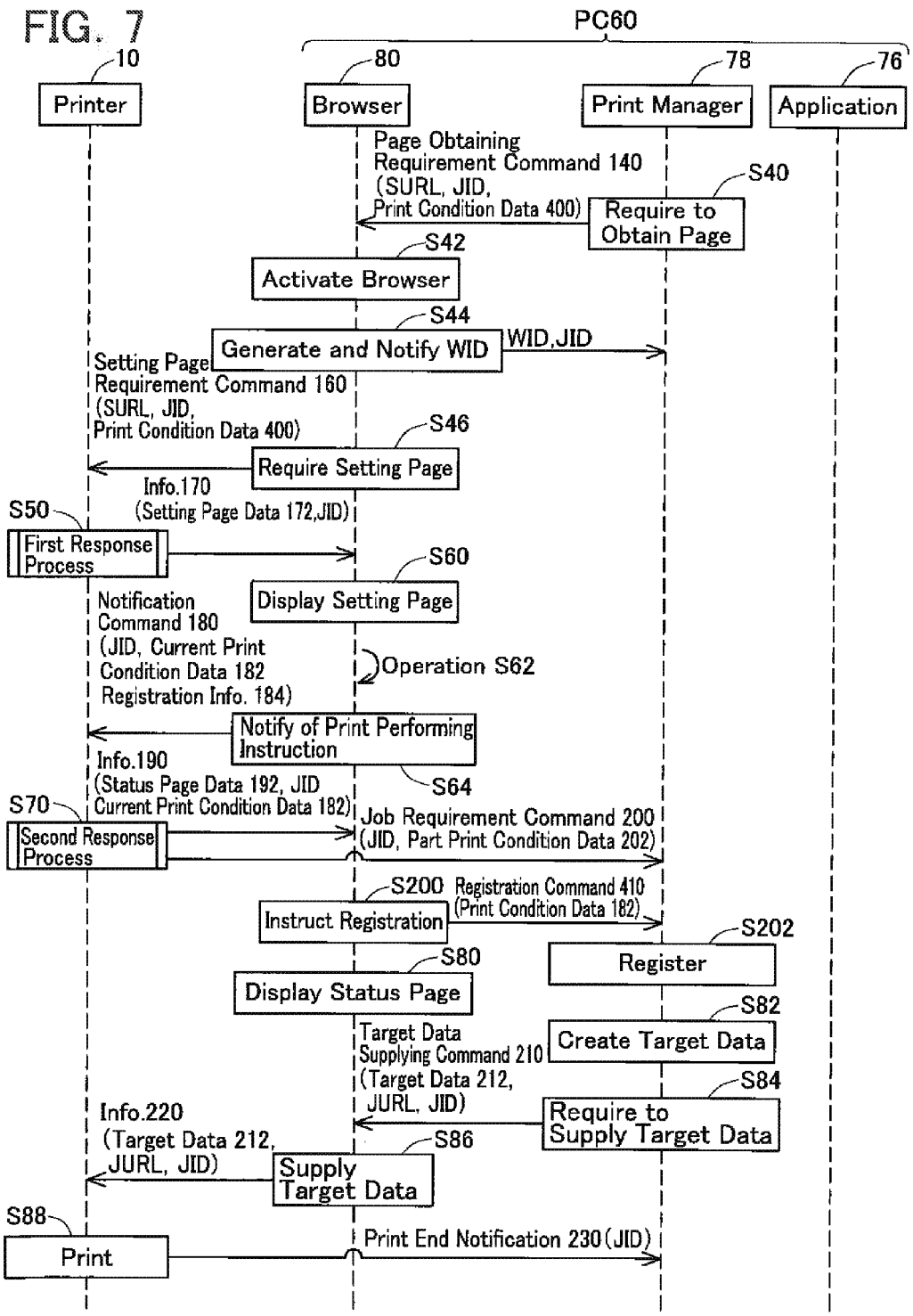

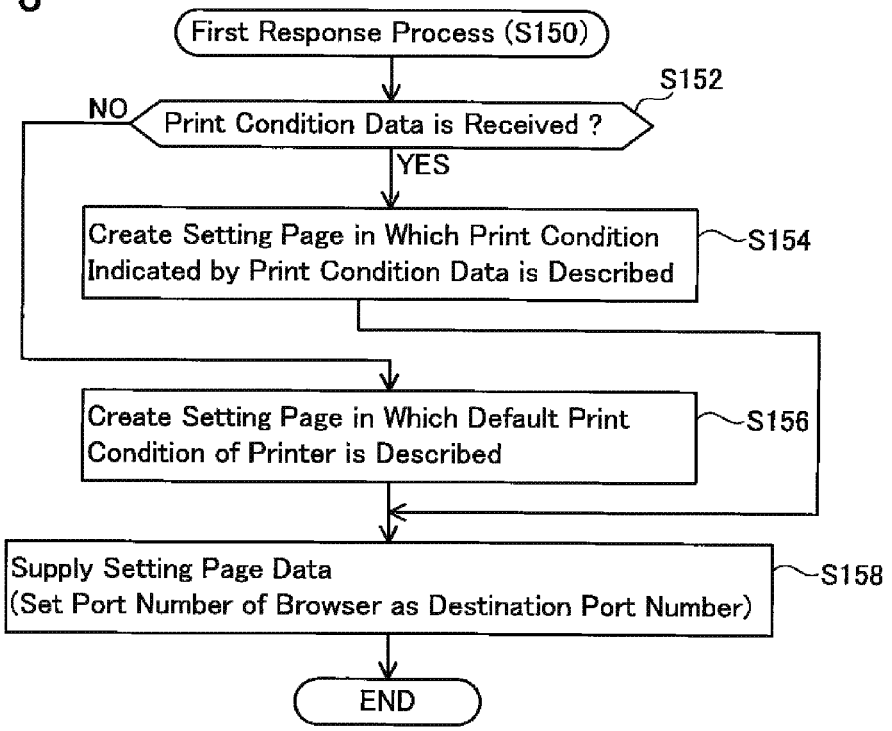
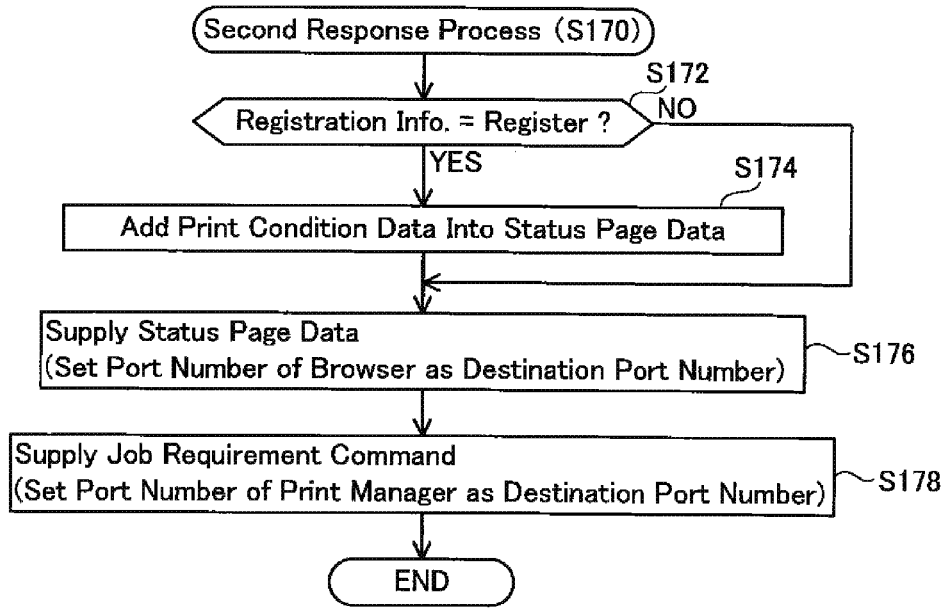

PRINTER FOR REQUIRING TERMINAL DEVICE TO SUPPLY TARGET DATA AND TERMINAL DEVICE FOR SUPPLYING TARGET DATA IN RESPONSE TO REQUIREMENT FROM PRINTER

CROSS-REFERENCE TO RELATED APPLICATIONS

This application claims priority to Japanese Patent Application No. 2010-067689, filed on Mar. 24, 2010, the contents of which are hereby incorporated by reference into the present application.

TECHNICAL FIELD

The present specification discloses a technique regarding a communication to be performed between a printer and a terminal device via a network.

DESCRIPTION OF RELATED ART

For example, a system comprising a client device, a print server, and a printer is known. In this system, the client device accesses the print server using a web browser installed in the client device. When accessed by the client device, the print server sends a print setting page that can be interpreted by the web browser to the client device. A user of the client device can set a print condition (e.g., a paper size, a number of colors, or the like) on the print setting page. Upon finishing setting the print condition, the user operates an OK button on the print setting page. At this point, a sending module of the client device is activated, whereby the sending module sends data indicating a specific print condition set by the user to the print server. In addition, the sending module instructs a transfer module of the client device to transfer a specific file of a print target to the print server. Accordingly, the transfer module transfers the specific file to the print server. The print server creates print data in accordance with the specific print condition using the specific file and sends the print data to the printer. The printer performs printing in accordance to the print data.

SUMMARY

In the technique described above, it is assumed that, when performing print is instructed on the print setting page by the user of the client device (in other words, when the OK button is operated), the web browser of the client device instructs the sending module to cause the transfer module to transfer the specific file. Accordingly, pursuant to an instruction from the web browser, the sending module instructs the transfer module to transfer the specific file, and pursuant to an instruction from the sending module, the transfer module transfers the specific file to the print server. In other words, in the above technique, when performing print is instructed on a web page, a special mechanism (program) that enables the web browser to give an instruction to the sending module which causes the transfer module to transfer the specific file must be added to the web browser.

The present specification provides a technique that enables a terminal device to supply target data of a print target to a printer when performing print is instructed on a web page without having to add the aforementioned special mechanism to a web browser.

The present specification discloses a printer configured to be connected with the terminal device via a network. The printer may comprise a screen data supplying unit, a target data requiring unit, a target data obtaining unit, and a print performing unit. The screen data supplying unit may be configured to supply print instruction screen data to the terminal device. The print instruction screen data may be capable of being interpreted by a web browser of the terminal device. The print instruction screen data may represent a print instruction screen which includes an instruction button for instructing the printer to perform a print. The target data requiring unit may be configured to make, in a case where selection information is obtained from the terminal device, a requirement requiring the terminal device to supply target data of a print target. The selection information may be supplied from the terminal device to the printer in a case where the instruction button in the print instruction screen is selected by a user of the terminal device. Further, the selection information may be, but not limited to, information indicating that the instruction button in the print instruction screen has been selected by the user. The target data obtaining unit may be configured to obtain the target data supplied from the terminal device in accordance with the requirement. The print performing unit may be configured to print an image represented by the target data.

The present specification discloses a terminal device configured to be connected with a printer via a network. The terminal device may comprise a screen data obtaining unit, a selection information supplying unit, a target data requirement obtaining unit, and a target data supplying unit. The screen data obtaining unit may be configured to obtain print instruction screen data from the printer. The print instruction screen data may be capable of being interpreted by a web browser of the terminal device. The print instruction screen data may represent a print instruction screen which includes an instruction button for instructing the printer to perform a print. The selection information supplying unit may be configured to supply selection information to the printer in a case where the instruction button in the print instruction screen is selected by a user. The target data requirement obtaining unit may be configured to obtain, from the printer, after the selection information is supplied to the printer, a requirement requiring the terminal device to supply target data of a print target. The target data supplying unit may be configured to supply the target data in accordance with the requirement.

Moreover, a control method, a computer program, and a non-transitory computer-readable storage medium storing the computer program for realizing the printer described above are also novel and useful. In addition, a control method, a computer program, and a non-transitory computer-readable storage medium storing the computer program for realizing the terminal device described above are also novel and useful. Furthermore, a system comprising the aforementioned printer and terminal device is also novel and useful.

BRIEF DESCRIPTION OF THE DRAWINGS

FIG. 7 illustrates a sequence diagram of processes executed by respective devices according to a second embodiment;

FIG. 8 illustrates a flow chart of a first response process of S150 in FIG. 7; and FIG. 9 illustrates a flow chart of a second response process of S170 in FIG. 7.

EMBODIMENT

First Embodiment (System Configuration)

Figure 1:
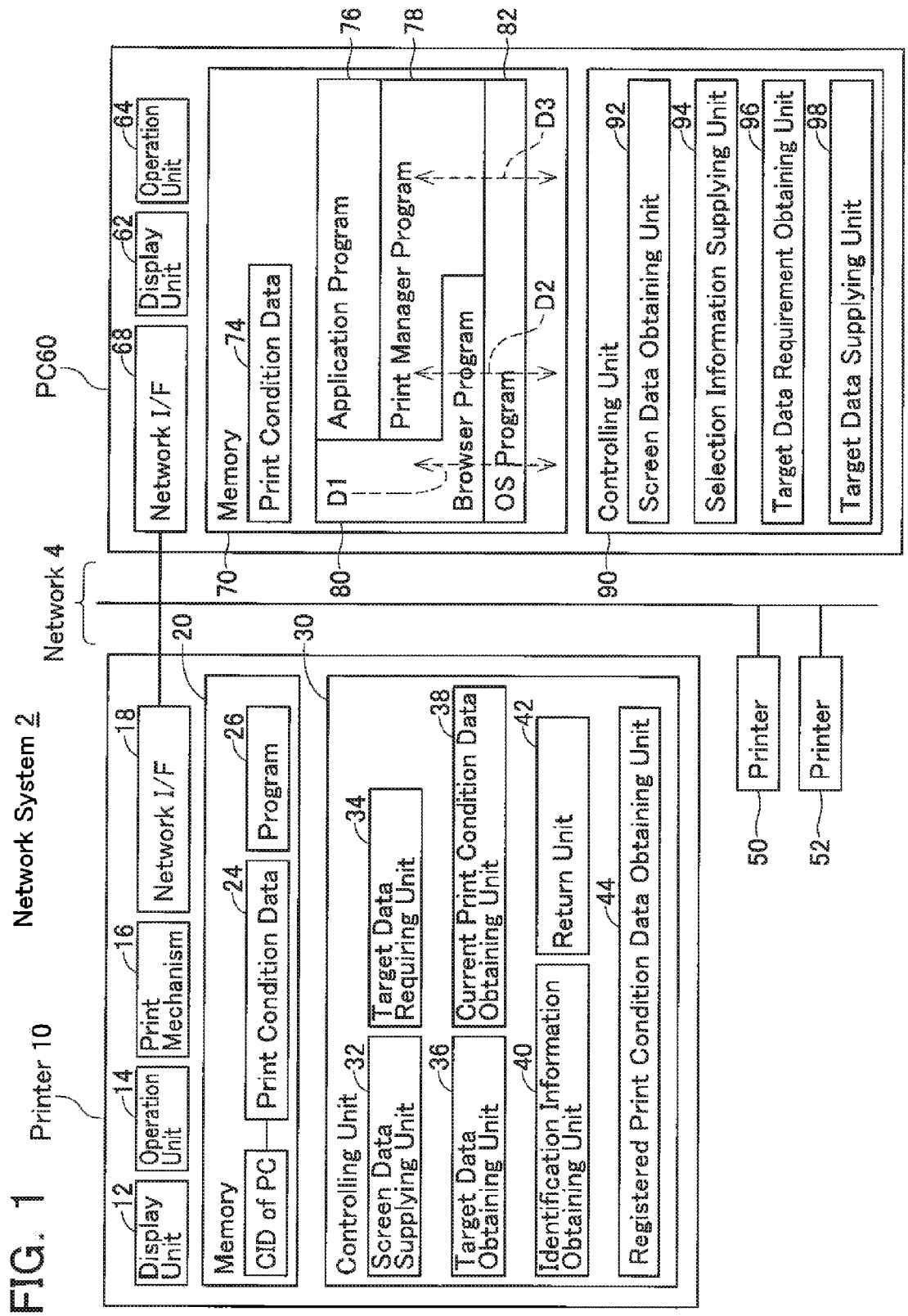
FIG. 1 illustrates a configuration of a network system according to an embodiment.

A first embodiment will be described with reference to the drawings. As illustrated in FIG. 1, a network system 2 comprises a plurality of printers 10 and a PC 60. The plurality of printers 10 is connected to the PC 60 via a network (such as a LAN) 4. The plurality of printers 10 and the PC 60 are able to communicate between each other via the network 4. While only one PC 60 is disclosed in FIG. 1, other PCs may additionally be connected to the network 4.

(Configuration of Printer 10)

A configuration of the printer 10 will be described. Note that configurations of printers 50 and 52 are similar to the configuration of the printer 10. The printer 10 comprises a display unit 12, an operation unit 14, a print mechanism 16, a network interface 18, a memory 20, and a controlling unit 30. The display unit 12 is a display for displaying various types of information. The operation unit 14 comprises a plurality of keys. By operating the operation unit 14, a user can input various instructions into the printer 10. The print mechanism 16 is a print mechanism employing an inkjet system, a laser system, or the like. The network interface 18 is connected to the network 4.

The memory 20 is a non-volatile memory. Note that a volatile memory (work area) included in the printer 10 is not illustrated in FIG. 1. The memory 20 stores, in a process performed in S76 in FIG. 5 (to be described later), an association of identification information (hereinafter referred to as a "CID (Client ID)") of the PC 60 and print condition data 24 obtained from the PC 60. The CID of the PC 60 is, e.g., a MAC address of the PC 60. The memory 20 further stores a program 26 to be executed by the controlling unit 30. Functions of respective units 32 to 44 are realized as a result of the controlling unit 30 executing processes according to the program 26.

(Configuration of PC 60)

The PC 60 comprises a display unit 62, an operation unit 64, a network interface 68, a memory 70, and a controlling unit 90. The display unit 62 is a display for displaying various types of information. The operation unit 64 comprises a mouse and a keyboard. By operating the operation unit 64, a user can input various instructions into the PC 60. The network interface 68 is connected to the network 4.

The memory 70 is a non-volatile memory. Note that a volatile memory (work area) included in the PC 60 is not illustrated in FIG. 1. In addition, while FIG. 1 illustrates the memory 70 as though storing print condition data 74, a configuration where the memory 70 stores print condition data 74 is used in a second embodiment to be described later. Therefore, in the present embodiment, the memory 70 need not store the print condition data 74. The memory 70 stores various programs 76, 78, 80, and 82 to be executed by the controlling unit 30.

An application program 76 is a known application program, e.g., text editing software such as word-processing software or spreadsheet software. A print manager program 78 is a program for realizing various print-related functions at the printer 10 and the like. A browser program 80 is a program for realizing various functions related to communication and display of a web page. An OS (Operating System) program 82 is a program that collaborates with the respective programs 76, 78, and 80 to realize various basic functions. An arrow D1 indicates that there is a function realized by a collaboration of the browser program 80 and the OS program 82. Similarly, as indicated by an arrow D2, there is a function realized by a collaboration of the print manager program 78, the browser program 80, and the OS program 82. In addition, as indicated by an arrow D3, there is a function realized without the participation of the browser program 80 by a collaboration of the print manager program 78 and the OS program 82.

The controlling unit 90 is capable of executing various processes according to the respective programs 76, 78, 80, and 82. In particular, functions of respective units 92 to 98 are realized as a result of the controlling unit 90 executing processes according to the print manager program 78 and the browser program 80.

(Processes Executed by the Respective Devices 10, 50, 52, and 60)

Figure 2:
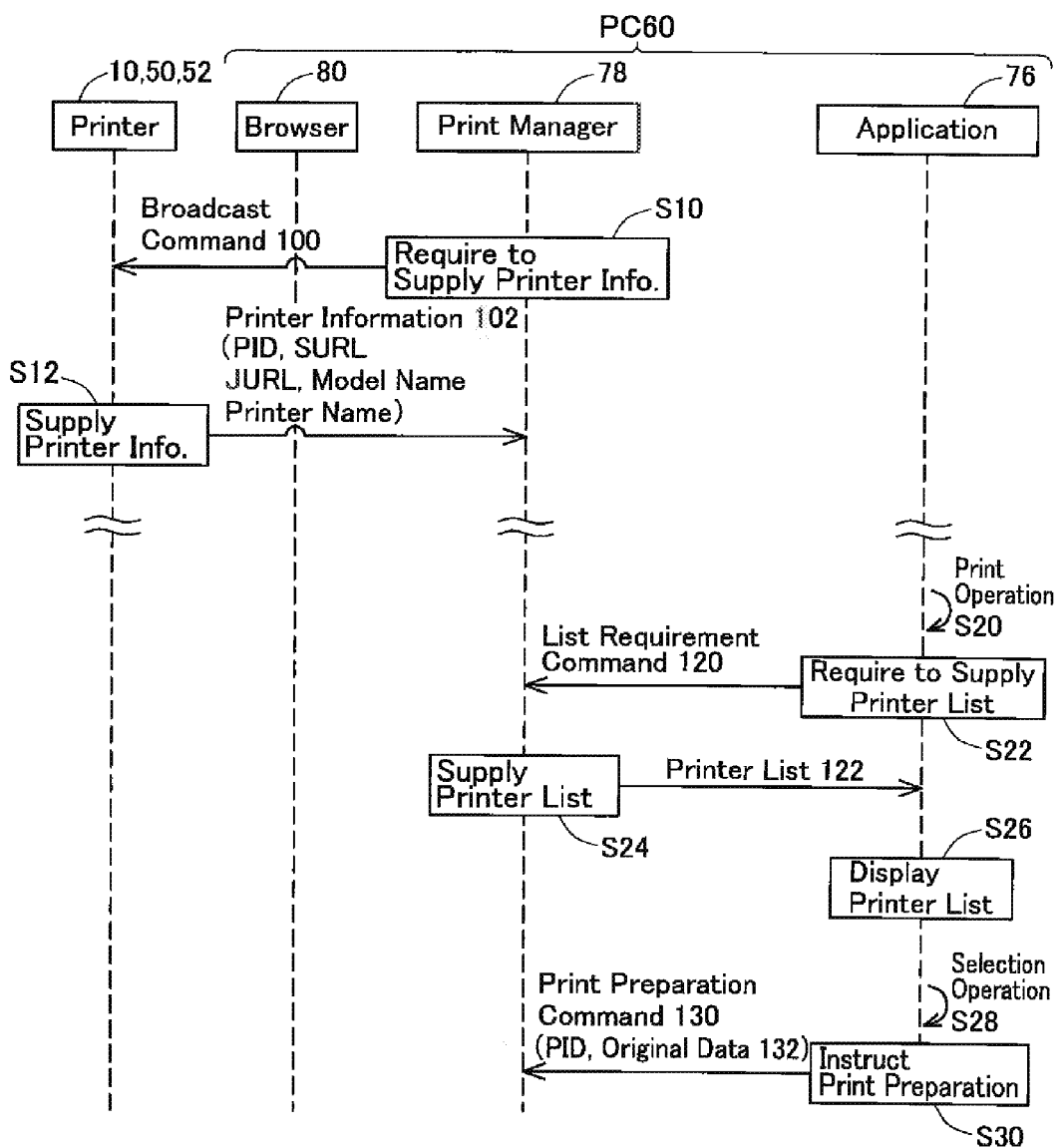
FIG. 2 illustrates a sequence diagram of processes executed by respective devices according to a first embodiment.
Figure 3:
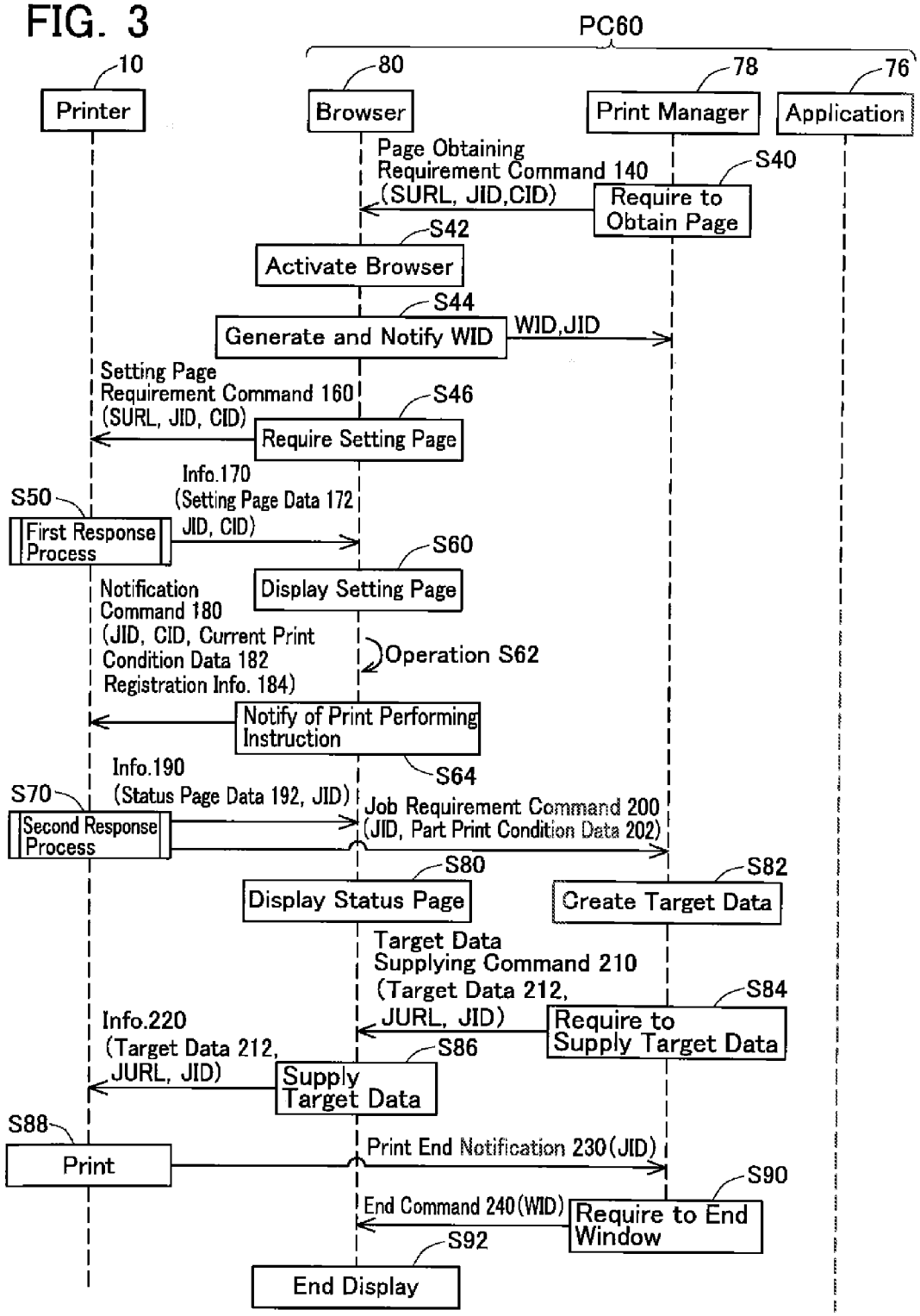
FIG. 3 illustrates a sequence diagram that is a continuation of FIG. 2.

Next, contents of processes executed by the respective devices 10, 50, 52, and 60 will be described with reference to FIGS. 2 to 5. In FIGS. 2 and 3, "browser 80" denotes functions realized by the controlling unit 90 of the PC 60 by executing the browser program 80. Similarly, "print manager 78" and "application 76" respectively denote functions realized by the controlling unit 90 of the PC 60 by executing the print manager program 78 and the application program 76.

As illustrated in FIG. 2, the print manager 78 makes, at a predetermined timing (e.g., at a timing when power of the PC 60 is turned on), a requirement requiring to supply printer information (S10). Specifically, the print manager 78 broadcasts a predetermined command 100 to the network 4. Moreover, as indicated by the arrow D3 in FIG. 1, the process of S10 is realized by the collaboration of the print manager program 78 and the OS program 82. The respective printers 10, 50, and 52 receive the predetermined command 100. In response to the predetermined command 100, the respective printers 10, 50, and 52 supply their own printer information 102 to the PC 60 (S12). Accordingly, the print manager 78 of the PC 60 obtains a plurality of printer information 102 corresponding to the plurality of printers 10, 50, and 52. The print manager 78 registers the plurality of obtained printer information 102 in a volatile memory (not shown).

Printer information 102 includes a PID (Printer ID), an SURL (Setting URL), a JURL (Job URL), a model name, and a printer name. For example, the PID is an ID for identifying the printer 10 and is, e.g., a MAC address. In addition, the printer 10 is equipped with a web server function. In other words, the program 26 (refer to FIG. 1) of the printer 10 includes a web server program. The SURL is a URL for the web server of the printer 10 to obtain a requirement for a web page and to supply data in accordance with the requirement. This web page represents, a setting page for allowing a user of the PC 60 to instruct setting of a print condition and to instruct performing print. In addition, the JURL is an URL for the web server of the printer 10 to obtain a print job, i.e., target data of a print target. The model name is a model name determined in advance by a vendor of the printer 10. The printer name is a printer name (node name) registered in advance in the printer 10 by a user (administrator) of the printer 10.

By operating the operation unit 64 of the PC 60, the user can activate the application program 76 such as word-processing software or the like. By further operating the operation unit 64 of the PC 60, the user can designate a specific file generated according to the application program 76 and cause an image represented by the specific file to be displayed on the display unit 62. The user can input an instruction to print the image represented by the specific file into the PC 60 (S20). In this case, the application 76 makes a requirement requiring the print manager 78 to supply a printer list (S22). Specifically, the application 76 sends a list requirement command 120 to the print manager 78. In accordance with the list requirement command 120, the print manager 78 supplies a printer list 122 including the aforementioned plurality of printer information 102 to the application 76 (S24). The application 76 causes the printer list 122 to be displayed on the display unit 62 of the PC 60. In other words, the model names, the printer names, and the like of the respective printers 10, 50, and 52 are displayed on the display unit 62. Accordingly, the user is able to know that the plurality of printers 10, 50, and 52 capable of performing print is connected to the network 4.

By operating the operation unit 64 of the PC 60, the user can select a single printer to perform print from the plurality of printers 10, 50, and 52 (S28). At this point, the application 76 instructs the print manager 78 to perform a print preparation operation. Specifically, the application 76 sends a print preparation command 130 to the print manager 78. The print preparation command 130 includes a PID of the printer selected by the user in S28 and the aforementioned specific file (hereinafter referred to as "original data") 132 designated by the user in S20. Hereinafter, the description will continue using an example of a case where the printer 10 is selected by the user in S28.

Upon obtaining the print preparation command 130, the print manager 78 first generates a new JID (Job ID). The JID is an ID for identifying a print job. Furthermore, the print manager 78 associates a generated JID with original data 132 included in the print preparation command 130, and stores the same in a volatile memory (not shown). Next, the print manager 78 identifies a SURL of the printer 10 from printer information 102 obtained from the printer 10. Subsequently, as illustrated in FIG. 3, the print manager 78 makes a requirement requiring the browser 80 to obtain a setting page. Specifically, the print manager 78 sends a page obtaining requirement command 140 to the browser 80. The page obtaining requirement command 140 includes the identified SURL of the printer 10, a generated JID, and a CID of the PC 60.

The browser 80 is activated upon sending of the page obtaining requirement command 140 to the browser 80 (S42). At this point, the browser 80 generates a new WID (Window ID). The WID is an ID for identifying a window for displaying a web page. In addition, the browser 80 notifies the generated WID and the JID included in the page obtaining requirement command 140 to the print manager 78 (S44). Accordingly, the print manager 78 associates the WID and the JID with each other and stores the same in the volatile memory (not shown). Furthermore, the browser 80 generates a port number of the browser 80 (hereinafter referred to as a "BPN (Browser Port Number)"). The browser 80 generates the BPN by randomly selecting a single port number from a range of port numbers determined in advance. Meanwhile, a port number of the print manager 78 (hereinafter referred to as an "MPN (Manager Port Number)") of the PC 60 is a fixed port number determined in advance. The MPN is not included in the aforementioned range of port numbers for generating the BPN of the browser 80. Therefore, the BPN and the MPN differ from each other.

Next, the browser 80 makes a requirement requiring the printer 10 to supply a setting page (S46). Specifically, the browser 80 sends a setting page requirement command 160 to the printer 10. In the setting page requirement command 160, the SURL of the printer 10 (the SURL included in the page obtaining requirement command 140) is set as a destination URL. In addition, in the setting page requirement command 160, the generated BPN is set as a sender port number. Furthermore, the setting page requirement command 160 includes the JID included in the page obtaining requirement command 140 and the CID of the PC 60 included in the page obtaining requirement command 140.

By having the print manager 78 supply the page obtaining requirement command 140 to the browser 80 as described above, the browser 80 supplies the setting page requirement command 160 to the printer 10. Therefore, as indicated by the arrow D2 in FIG. 1, these processes are realized by the collaboration of the print manager program 78, the browser program 80, and the OS program 82.

The controlling unit 30 of the printer 10 obtains the setting page requirement command 160 from the PC 60. As described above, the setting page requirement command 160 includes the CID of the PC 60. Therefore, by having the controlling unit 30 of the printer 10 obtain the setting page requirement command 160, an identification information obtaining unit 40 obtains the CID of the PC 60. Since the SURL of the printer 10 is set as the destination URL in the setting page requirement command 160, a web server program of the printer 10 is activated. The controlling unit 30 of the printer 10 executes a first response process according to the web server program (S50).

Figure 4:
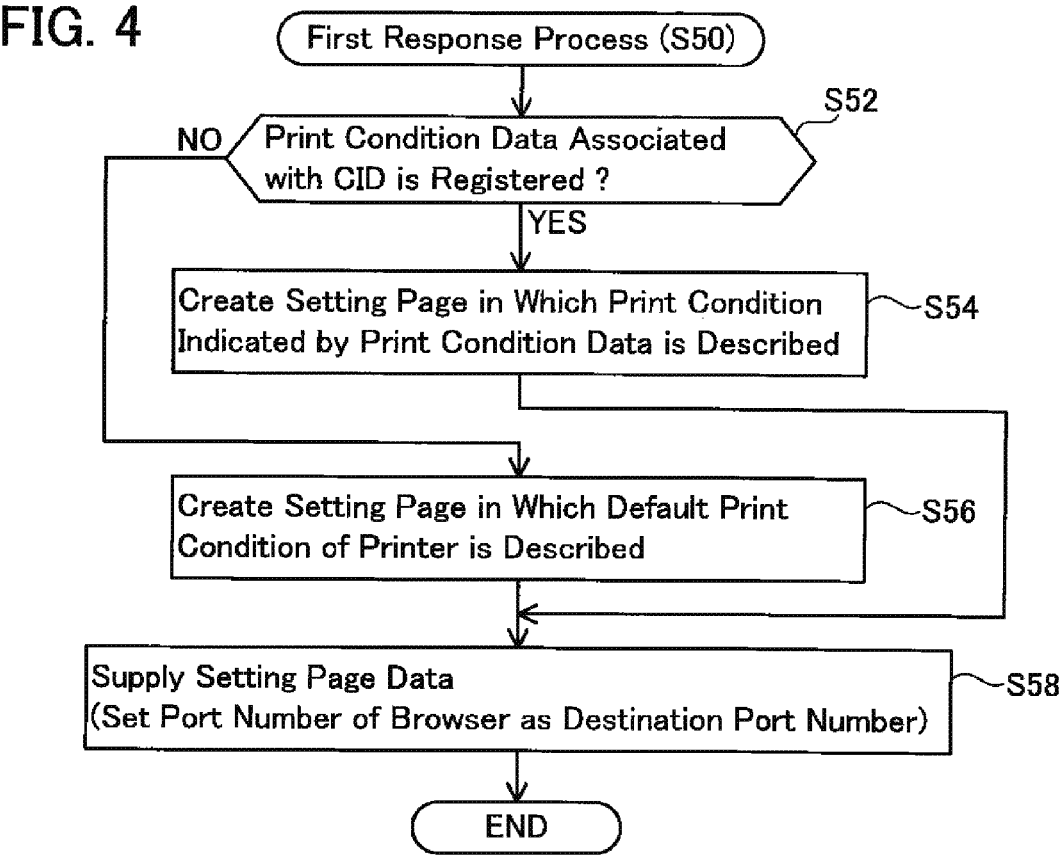
FIG. 4 illustrates a flow chart of a first response process of S50 in FIG. 3.

As illustrated in FIG. 4, in the first response process, a screen data supplying unit 32 of the printer 10 determines whether or not print condition data is registered in the memory 20 in association with the CID of the PC 60 included in the setting page requirement command 160 (S52). If YES in S52, the screen data supplying unit 32 creates setting page data representing a setting page in which a print condition is described. This print condition is indicated by the print condition data registered in association with the CID of the PC 60 (hereinafter referred to as a "registered print condition") (S54). Specifically, the screen data supplying unit 32 obtains a setting page template stored in advance in the memory 20, and writes the aforementioned registered print condition into the template. The aforementioned template is described in a data format such as HTML (Hyper Text Markup Language) and XML (Extensible Markup Language) that can be interpreted by the browser 80 of the PC 60. Therefore, setting page data to be created in S54 (as well as in S56 to be described later) also has a data format that can be interpreted by the browser 80 of the PC 60.

Figure 6:
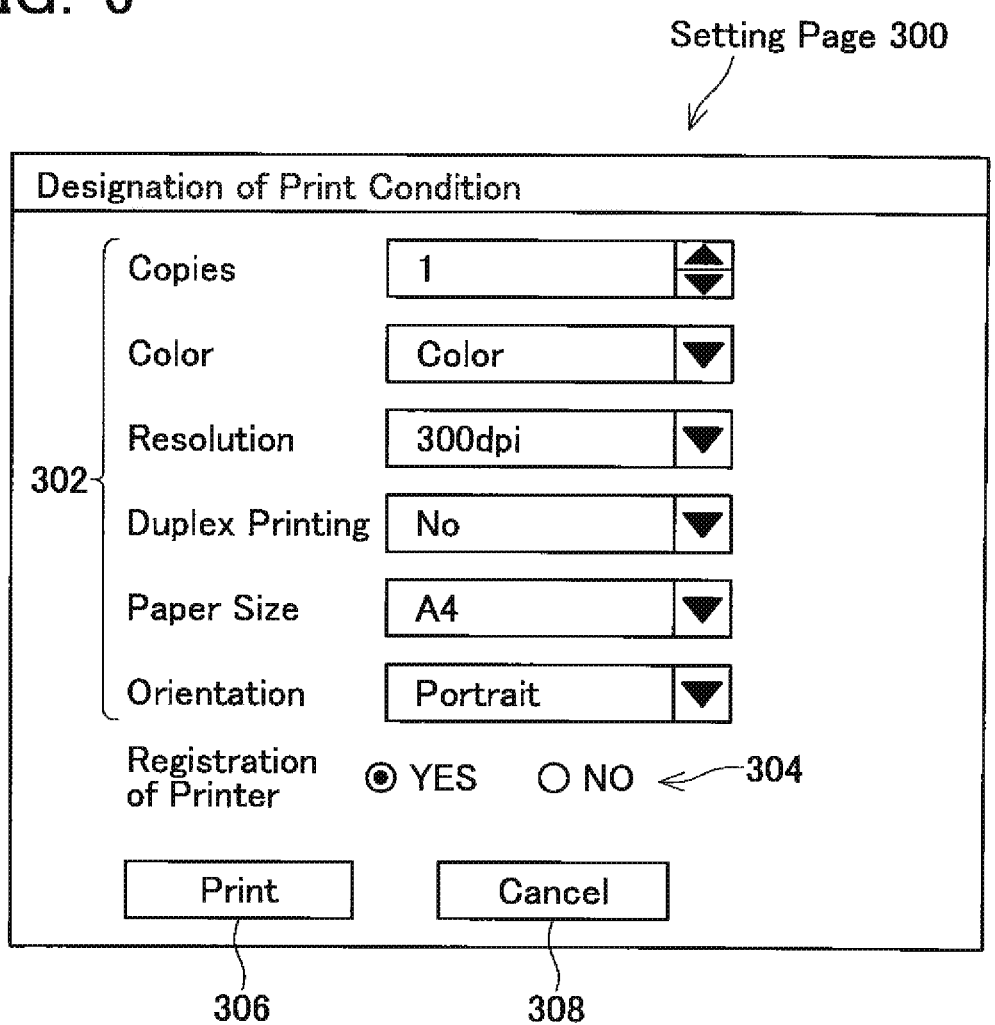
FIG. 6 illustrates an example of a setting page.

FIG. 6 illustrates an example of a setting page 300. The setting page 300 includes a setting field 302 that allows the user to set a print condition of the printer 10. The print condition of the printer 10 includes a plurality of setting items (number of copies, color, print resolution, whether or not duplex printing is to be performed, paper size, print orientation of document, and the like). Therefore, the setting field 302 is a field (area) used by the user to set contents of the plurality of setting items. Contents (e.g., "1" for number of copies and "color" for color) of the respective setting items included in the setting field 302 are not initially described in the setting page template. In S54, the screen data supplying unit 32 writes the contents of the respective setting items included in the registered print condition into the setting field 302 of the setting page template.

The setting page 300 further includes a registration button 304 that allows the user to select whether or not the print condition data indicating the print condition set in the setting field 302 is to be registered to the printer 10. The registration button 304 is a so-called radio button, and a selection of "YES" signifies registration and a selection of "NO" signifies no registration. Moreover, in the setting page template, the registration button 304 is in a state where "NO" has initially been selected. In addition, the setting page 300 further includes a print button 306 and a cancel button 308. The buttons 306 and 308 are included in advance in the setting page template.

In the case of NO in S52 in FIG. 4, the screen data supplying unit 32 creates setting page data representing a setting page in which a default print condition is described (S56). The default print condition refers to a print condition designated in advance by the user (administrator) of the printer 10. The memory 20 of the printer 10 stores default print condition data representing the default print condition. In S56, the screen data supplying unit 32 obtains the setting page template and writes the contents of the respective setting items included in the default print condition into the setting field 302 of the setting page template.

Once S54 or S56 is completed, the screen data supplying unit 32 supplies the setting page data created in S54 or S56 to the PC 60 (S58). Moreover, in S58, the screen data supplying unit 32 sets the BPN (the port number of the browser 80), that is set as the sender port number of the setting page requirement command 160 illustrated in FIG. 3, as a destination port number. Therefore, the setting page data is supplied to the browser 80 of the PC 60. As illustrated in FIG. 3, information 170 to be supplied to the browser 80 of the PC 60 in S58 includes the setting page data 172 generated in S54 or S56, the JED included in the setting page requirement command 160, and the CID of the PC 60 included in the setting page requirement command 160.

In S60 in FIG. 3, the browser 80 of the PC 60 first obtains the information 170 from the printer 10. Accordingly, a screen data obtaining unit 92 of the PC 60 obtains the setting page data 172 included in the information 170. The browser 80 causes the setting page 300 (refer to FIG. 6) represented by the setting page data 172 to be displayed on the display unit 62. Specifically, the browser 80 causes the setting page 300 to be displayed in a window corresponding to the WID generated in S44. By controlling the operation unit 64, the user can change the contents of the respective setting items included in the setting field 302 in the setting page 300. In other words, the user can set the print condition to be used for the print at this time (hereinafter referred to as a "current print condition").

Furthermore, by operating the operation unit 64, the user can select a print button 306 (e.g., by performing a click operation of the print button 306) in the setting page 300 (S62). In this case, the browser 80 sends a notification command 180 indicating a print performing instruction to the printer 10 (S64). Accordingly, a selection information supplying unit 94 of the PC 60 supplies the notification command 180 to the printer 10. In the notification command 180, the SURL of the printer 10 is set as the destination URL and the port number BPN of the browser 80 is set as the sender port number. The notification command 180 includes the JID, the CID of the PC 60, current print condition data 182, and registration information 184. The current print condition data 182 is data indicating the print condition (hereinafter referred to as a "current print condition") displayed in the setting field 302 in the setting page 300 when the print button 306 is operated (upon operation of S62). In addition, the registration information 184 is data indicating whether "YES" or "NO" of the registration button 304 in the setting page 300 is selected when the print button 306 has been operated (upon operation of S62). Moreover, alternatively, the registration information 184 may be arranged so as to be included in the notification command 180 only when "YES" of the registration button 304 in the setting page 300 is selected.

When the browser 80 (screen data obtaining unit 92) obtains setting page data 172 from the printer 10 and an operation of S62 (print performing instruction) is performed as described above, the browser 80 (selection information supplying unit 94) supplies the notification command 180 to the printer 10 (S64). Therefore, as indicated by the arrow D1 in FIG. 1, these processes are realized by the collaboration of the browser program 80 and the OS program 82.

The controlling unit 30 of the printer 10 obtains the notification command 180 from the PC 60. Accordingly, a current print condition data obtaining unit 38 of the PC 10 obtains the current print condition data 182 included in the notification command 180. Since the SURL of the printer 10 is set as the destination URL in the notification command 180, upon obtaining the notification command 180, the controlling unit 30 of the printer 10 executes, a second response process according to the web server program (S70).

Figure 5:
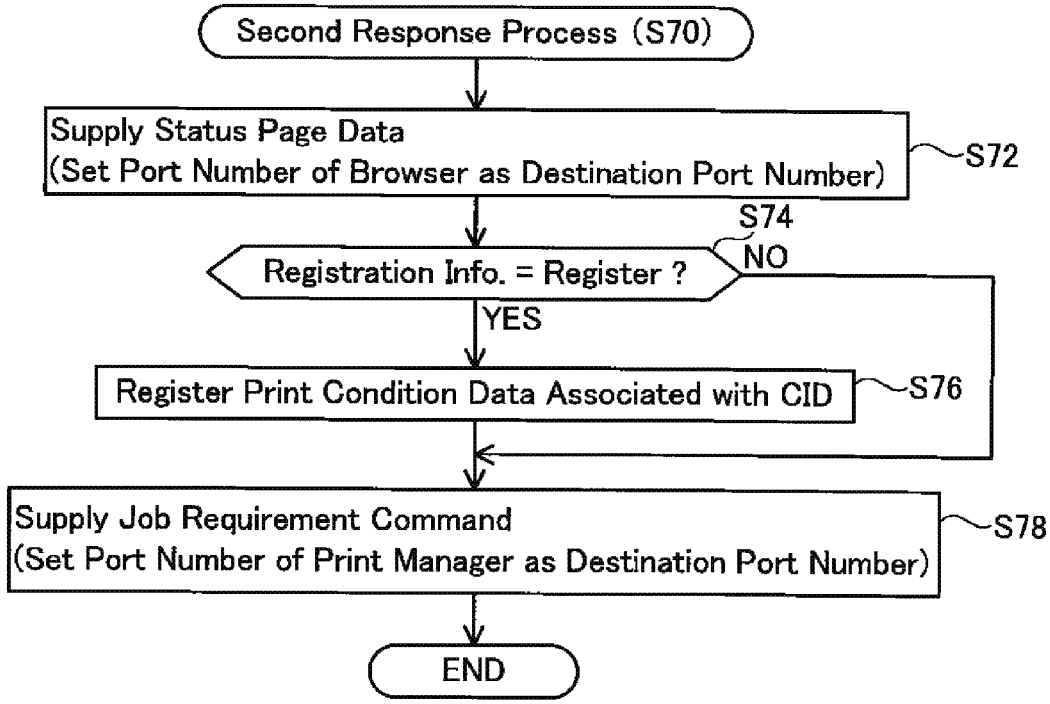
FIG. 5 illustrates a flow chart of a second response process of S70 in FIG. 3.

As illustrated in FIG. 5, in the second response process, the screen data supplying unit 32 of the printer 10 supplies status page data representing a status page indicating a current print situation of the printer 10 to the PC 60 (S72). The status page data is also described in a data format that can be interpreted by the browser 80 of the PC 60. Moreover, in S72, the screen data supplying unit 32 sets the BPN (the port number of the browser 80), that is set as the sender port number of the notification command 180 illustrated in FIG. 3, as the destination port number. Therefore, the status page data is supplied, to the browser 80 of the PC 60. At the stage of S72, the status page includes a character string of, e.g., "preparing to print". As illustrated in FIG. 3, information 190 supplied to the PC 60 in S72 includes status page data 192 and the JID included in the notification command 180. The status page data 192 further includes data indicating a refresh time.

The browser 80 of the PC 60 obtains the information 190 from the printer 10. The browser 80 causes a status page represented by the status page data 192 included in the information 190 to be displayed on the display unit 62 (S80). Specifically, the browser 80 updates the display in the window corresponding to the WID generated in S44 from the setting page 300 to the status page. Accordingly, the user of the terminal device can learn the current print situation of the printer 10.

The browser 80 obtains the status page data 192 from the printer 10 as described above and the browser 80 causes the status page to be displayed on the display unit 62 (S80). Therefore, as indicated by the arrow D1 in FIG. 1, these processes are realized by the collaboration of the browser program 80 and the OS program 82.

Moreover, although not shown in FIG. 3, when the refresh time included in the status page data 192 lapses, the browser 80 makes a requirement requiring the printer 10 to supply a new status page. Specifically, the browser 80 sends a status page requirement command including the JID included in the information 190 to the printer 10. The screen data supplying unit 32 of the printer 10 supplies the PC 60 with new status page data representing a status page (e.g., a status page including a character string of "printing") indicating a current print situation corresponding to the JID included in the status page requirement command. The browser 80 updates the display in the window corresponding to the WID generated in S44 to the new status page. The new status page data also includes data representing a refresh time. Therefore, when the refresh time included in the new status page data lapses, the browser 80 once again makes a requirement requiring the printer 10 to supply a new status page. In other words, the requirement, supply, and display of new status pages are repetitively performed. Accordingly, the user of the PC 60 can learn the latest print situation of the printer 10.

As illustrated in FIG. 5, after S72 is completed, the current print condition data obtaining unit 38 of the printer 10 determines whether or not the registration information 184 included in the notification command 180 indicates "YES" (in other words, "YES" of the registration button 304 illustrated in FIG. 6) (S74). If YES in S74, the current print condition data obtaining unit 38 registers, in the non-volatile memory 20, an association of the current print condition data 182 included in the notification command 180 and the CID of the PC 60 included in the notification command 180 (S76). If print condition data is already registered in the memory 20 in association with the CID of the PC 60 when performing the process of S76, the current print condition data obtaining unit 38 erases the registered print condition data from the memory 20. Upon completion of S76, the current print condition data obtaining unit 38 proceeds to S78.

On the other hand, if NO in S74 (in other words, when the registration information 184 indicates "NO"), the current print condition data obtaining unit 38 skips S76 and proceeds to S78. That is, in this case, the current print condition data obtaining unit 38 does not register the current print condition data 182 in the non-volatile memory 20. Moreover, regardless of whether S74 results in YES or NO, the current print condition data obtaining unit 38 stores, in the volatile memory (not shown), an association of the current print condition data 182 and the JID included in the notification command 180.

In S78, the target data requiring unit 34 of the printer 10 makes a requirement requiring the PC 60 to supply target data. Specifically, the target data requiring unit 34 sends a job requirement command to the PC 60. In S78, the target data requiring unit 34 sets the port number MPN of the print manager 78 of the PC 60 as the destination port number. Therefore, the job requirement command is supplied to the print manager 78 of the PC 60. The MPN is stored in advance in the memory 20 of the printer 10. As shown in FIG. 3, a job requirement command 200 supplied to the print manager 78 of the PC 60 in S78 includes the JID included in the notification command 180 and part print condition data 202. The part print condition data 202 is data indicating contents of a limited number of setting items, ranging from one or more but not all, among the plurality of setting items included in the current print condition indicated by the current print condition data 182. The one or more setting items included in the part print condition data 202 may be referred to as "partial setting items". In the present embodiment, color, resolution, and paper size are the partial setting items described above. Therefore, the part print condition data 202 is data indicating the content of color (e.g., "color") included in the current print condition, the content of resolution (e.g., "300 dpi") included in the current print condition, and the content of paper size (e.g., "A4") included in the current print condition.

The print manager 78 of the PC 60 obtains the job requirement command 200 from the printer 10. Accordingly, a target data requirement obtaining unit 96 of the PC 60 obtains the job requirement command 200. As indicated by the arrow D3 in FIG. 1, this process is realized by the collaboration of the print manager program 78 and the OS program 82.

In S82 illustrated in FIG. 3, the print manager 78 of the PC 60 creates the target data of the print target. As described above, when obtaining the print preparation command 130 illustrated in FIG. 2, the print manager 78 associates the JID with original data 132 and stores the same in the volatile memory (not shown). In S82, the print manager 78 obtains the original data 132 associated with the HD included in the job requirement command 200 from the volatile memory. Next, the print manager 78 generates target data from the original data 132 according to part print condition data 202 (the respective contents of color, resolution, and paper size) included in the job requirement command 200. Specifically, e.g., when the content of color indicated by the part print condition data 202 is "color", the print manager 78 creates the target data conforming to color printing, and when the content of color indicated by the part print condition data 202 is "monochrome", the print manager 78 creates the target data conforming to monochrome printing. In addition, the print manager 78 creates the target data conforming to the resolution indicated by the part print condition data 202, and creates the target data conforming to the paper size indicated by the part print condition data 202.

Next, the print manager 78 identifies the JURL of the printer 10 based on the printer information 102 (refer to FIG. 2) obtained from the printer 10. The print manager 78 then makes a requirement requiring the browser 80 to supply the target data (S84). Specifically, the print manager 78 sends a target data supplying command 210 to the browser 80. The target data supplying command 210 includes the target data 212 created in S82, the identified JURL of the printer 10, and the JID included in the job requirement command 200.

Upon obtaining the target data supplying command 210, the browser 80 supplies information 220 to the printer 10 (S86). In the information 220, the JURL of the printer 10 (the JURL included in the target data supplying command 210) is set as the destination URL. In addition, the information 220 includes the target data 212 included in the target data supplying command 210 and the JID included in the target data supplying command 210.

By having the print manager 78 supply the target data supplying command 210 to the browser 80 as described above, the browser 80 supplies the information 220 to the printer 10. Accordingly, a target data supplying unit 98 of the PC 60 supplies the target data 212 to the printer 10. As indicated by the arrow D2 in FIG. 1, this process is realized by the collaboration of the print manager program 78, the browser program 80, and the OS program 82.

The controlling unit 30 of the printer 10 obtains the information 220 from the PC 60. Accordingly, a target data obtaining unit 36 of the printer 10 obtains the target data 212 included in the information 220. Since the JURL of the printer 10 is set as the destination URL in the information 220, the target data obtaining unit 36 obtains the target data 212 according to the web server program.

Next, the controlling unit 30 of the printer 10 performs a process for printing an image represented by the target data 212 (S88). As described above, when obtaining the notification command 180, the current print condition data obtaining unit 38 stores an association of the current print condition data 182 and the JID in the volatile memory (not shown). In S88, the controlling unit 30 obtains the current print condition data 182 associated with the JID included in the information 220 from the volatile memory. The controlling unit 30 then creates the print data from the target data 212 according to the current print condition indicated by the current print condition data 182. Specifically, the controlling unit 30 creates the print data conforming to the document orientation indicated by the current print condition data 182. In the present embodiment, since the PC 60 creates the target data conforming to the size, the resolution, and the paper size in S82, the printer 10 need not perform a process for creating the target data conforming to the size, the resolution, and the paper size. As a result, the processing load on the controlling unit 30 is reduced. Furthermore, the controlling unit 30 drives the print mechanism 16 so that an image represented by the created print data (in other words, the image represented by the target data 212) is printed. In this case, the controlling unit 30 drives the print mechanism 16 according to the number of copies and to whether or not duplex printing is to be performed as indicated by the current print condition data 182. Accordingly, the print mechanism 16 prints the image represented by the created print data (in other words, the image represented by the target data 212) on a print medium.

Once the printing is completed, the controlling unit 30 supplies a print end notification 230 to the PC 60. In the print end notification 230, the port number MPN of the print manager 78 is set as the destination port number. Therefore, the print end notification 230 is supplied to the print manager 78 of the PC 60. Moreover, the print end notification 230 includes the JID, included in the information 220.

The print manager 78 of the PC 60 obtains the print end notification 230 from the printer 10. As described above, when obtaining the notification of S44, the print manager 78 associates the WID with the JID and stores the same in a volatile memory (not shown). The print manager 78 obtains the WID associated with the JID included in the print end notification 230 from the volatile memory. Next, the print manager 78 makes a requirement requiring the browser 80 to end the window display corresponding to the obtained WID (S90). Specifically, the print manager 78 sends an end command 240 including the WID to the browser 80. Upon obtaining the end command 240, the browser 80 closes the window corresponding to the WID included in the end command 240 (S92).

The first embodiment has been described in detail. According to the present embodiment, the browser 80 of the PC 60 causes the setting page 300 to be displayed on the display unit 62 according to the setting page data 172 supplied from the printer 10 (S60 in FIG. 3). The user of the PC 60 can select (perform a click operation on) a print button 306 in the setting page 300. In this case, the browser 80 of the PC 60 supplies the notification command 180 to the printer 10 (S64 in FIG. 3). Upon obtaining the notification command 180 from the PC 60, the printer 10 supplies the job requirement command 200 to the PC 60 (S70 in FIG. 3). In response to the job requirement command 200 from the printer 10, the PC 60 supplies the target data 212 to the printer 10 (S84 and S86 in FIG. 3). In the present embodiment, since a configuration is adopted in which the printer 10 makes a requirement requiring the PC 60 to supply the target data 212, the PC 60 can supply the target data 212 to the printer 10 in accordance with the requirement (the job requirement command 200) from the printer 10. In other words, even when the print button 306 in the setting page 300 is selected, the browser 80 of the PC 60 need not instruct a predetermined module (e.g., the print manager 78) to supply the target data 212. Therefore, the PC 60 can supply the target data 212 to the printer 10 when performing print is instructed on a web page without having to add the aforementioned special mechanism to the browser 80 of the PC 60.

The printer 10 sets the port number MPN of the print manager 78 to the destination port number and sends the job requirement command 200 to the PC 60 (S70 in FIG. 3). In other words, the printer 10 makes a requirement requiring the print manager 78 that is software different from the browser 80 of the PC 60 to supply the target data 212. In this case, the print manager 78 obtains the requirement requiring to supply the target data 212 (job requirement command 200) and supplies the target data 212 to the printer 10. Since the browser 80 is not required to supply the target data 212, the browser 80 need not instruct a predetermined module (e.g., the print manager 78) to supply the target data 212.

The printer 10 supplies the setting page data 172 representing the setting page 300 including the setting field 302 for setting a print condition to the PC 60 (S50 in FIG. 3). Since the printer 10 supplies the setting page data 172 to the PC 60, the setting page data 172 need not be stored in advance in the PC 60. In addition, the user of the PC 60 can set the current print condition on the setting page 300. The PC 60 supplies current print condition data 182 indicating the current print condition to the printer 10 (S64 in FIG. 3). The printer 10 prints the image represented by the target data 212 according to the current print condition indicated by the current print condition data 182 (S88 in FIG. 3). The printer 10 can print the image according to the intentions of the user of the PC 60.

The printer 10 supplies the part print condition data 202 to the PC 60 when making a requirement to supply target data (when supplying the job requirement command 200) (S70 in FIG. 3). Consequently, the PC 60 can create the target data 212 from the original data 132 according to the part print condition data 202 and supply the created target data 212 to the printer 10.

When registration of the current print condition data 182 is instructed from the PC 60 (if YES in S74 in FIG. 5), the printer 10 registers the current print condition data 182 in the non-volatile memory 20 in association with, the CID of the PC 60. Therefore, when the same PC 60 instructs the printer 10 to perform the next print, the printer 10 can reuse the current print condition data 182. In other words, as indicated in S54 in FIG. 4, the printer 10 can create the setting page data representing the setting page 300 in which the registered print condition is described. Accordingly, the user of the PC 60 can set the print condition to be used for the print at this time while referring to the print condition previously set by the user. On the other hand, when the registration of the current print condition data 182 is not instructed from the PC 60 (if NO in S74 in FIG. 5), the printer 10 does not register the current print condition data 182 in the non-volatile memory 20. In this case, the printer 10 uses the current print condition data 182 only for the print at this time (S88 in FIG. 3). The printer 10 is capable of determining whether or not to register the current print condition data 182 in the memory 20 according to the intention of the user of the PC 60 regarding registration of the current print condition data 182.

In addition, the printer 10 supplies the status page data 192 representing the status page indicating the print situation of the printer 10 to the PC 60 (S70 in FIG. 3). Accordingly, the user of the PC 60 can know the print situation of the printer 10.

The PC 60 is an example of a "terminal device". In addition, the print mechanism 16 is an example of a "print performing unit". The print button 306 included in the setting page 300 is an example of an "instruction button", and a first partial area which is a part of the setting page 300 and which includes the print button 306 is an example of a "print instruction screen". Furthermore, a second partial area which is a part of the setting page 300 and which includes the setting field 302 is an example of a "print setting screen". Therefore, among the setting page data 172, data representing the first partial area and data representing the second partial area respectively are examples of "print instruction screen data" and "print setting screen data". The status page data 192 is an example of "status screen data".

In addition, the notification command 180 and the job requirement command 200 respectively are examples of "selection information" and "requirement". BPN and MPN respectively are examples of a "first port number" and a "second port number". The current print condition indicated by the current print condition data 182 and the print condition described in S54 in FIG. 4 respectively are examples of a "first print condition" and a "second print condition".

Second Embodiment

A second embodiment will be described with reference to FIGS. 7 to 9. Descriptions of configurations and processes similar to those of the first embodiment will be omitted. FIG. 7 illustrates respective processes performed after the print preparation command 130 illustrated in FIG. 2 is supplied from the application 76 to the print manager 78. In FIG. 7, configurations and processes similar to those of the first embodiment are denoted using similar reference numbers. Simply stated, while print condition data is registered in the printer 10 in the first embodiment, print condition data 74 (refer to FIG. 1) is registered in the PC 60 in the present embodiment.

Upon obtaining the print preparation command 130, the print manager 78 sends the page obtaining requirement command 140 to the browser 80. Unlike the first embodiment, the page obtaining requirement command 140 in the present embodiment does not include the CID of the PC 60. In addition, when the print condition data 74 (refer to FIG. 1) is registered in the memory 70 of the PC 60, unlike the first embodiment, the page obtaining requirement command 140 includes print condition data 400 that is the same as the print condition data 74. The print condition data 74 is print condition data registered in the non-volatile memory 70 in the PC 60 in a process of S202 to be described later during a previously-performed print. Moreover, when the print condition data 74 is not registered in the memory 70 of the PC 60, the page obtaining requirement command 140 does not include the print condition data 400.

Furthermore, in the present embodiment, unlike the first embodiment, the setting page requirement command 160 supplied to the printer 10 from the browser 80 does not include the CID of the PC 60. In addition, when print condition data 400 is included in the page obtaining requirement command 140, unlike the first embodiment, the setting page requirement command 160 includes the print condition data 400. When the print condition data 400 is not included in the page obtaining requirement command 140, the setting page requirement command 160 does not include the print condition data 400. The controlling unit 30 of the printer 10 obtains the setting page requirement command 160 from the PC 60. Accordingly, a registered print condition data obtaining unit 44 of the printer 10 obtains the print condition data 400 included in the setting page requirement command 160. Upon obtaining the setting page requirement command 160, the controlling unit 30 of the printer 10 executes a first response process (S150).

As illustrated in FIG. 8, in the first response process, the screen data supplying unit 32 of the printer 10 determines whether or not the print condition data 400 is included in the setting page requirement command 160 (S152). If YES in S152, the screen data supplying unit 32 writes the contents of the respective setting items included in the print condition indicated by the print condition data 400 into the setting field 302 of the setting page template (S154). Accordingly, the setting page data is created which represents the setting page 300 in which the print condition indicated by the print condition data 400 is described. On the other hand, in the case of NO in S152, the screen data supplying unit 32 creates the setting page data representing the setting page on which the default print condition is described in the same manner as the process in S56 illustrated in FIG. 4 (S156).

Once S154 or S156 is completed, the screen data supplying unit 32 supplies the setting page data generated in S154 or S156 to the browser 80 of the PC 60 (S158). As illustrated in FIG. 7, unlike the first embodiment, the information 170 supplied to the browser 80 of the PC 60 in S158 does not include the CID of the PC 60.

Furthermore, in the present embodiment, unlike the first embodiment, the notification command 180 supplied to the printer 10 from the browser 80 does not include the CID of the PC 60. Upon obtaining the notification command 180 from the PC 60, the controlling unit 30 of the printer 10 executes a second response process (S170).

As illustrated in FIG. 9, in the second response process, a return unit 42 of the printer 10 determines whether or not the registration information 184 included in the notification command 180 indicates "YES" (in other words, "YES" of the registration button 304 illustrated in FIG. 6) (S172). If YES in S172, the return unit 42 adds the current print condition data 182 included in the notification command 180 to the status page data 192 representing the status page indicating the print situation of the printer 10 (S174). Upon completion of S174, the return unit 42 proceeds to S176. On the other hand, if NO in S174 (in other words, when the registration information 184 indicates "NO"), the return unit 42 skips S174 and proceeds to S176.

In S176, the information 190 including the status page data 192 is supplied to the PC 60. In S176 performed after performing S174, the screen data supplying unit 32 and the return unit 42 supply the information 190 including the current print condition data 182 to the PC 60. Accordingly, the current print condition data 182 is returned to the PC 60. On the other hand, in S176 performed without performing S174, the screen data supplying unit 32 supplies the information 190 not including the current print condition data 182 to the PC 60. That is, in this case, the current print condition data 182 is not returned to the PC 60. Next, the target data requiring unit 34 of the printer 10 supplies the job requirement command 200 to the print manager 78 of the PC 60 (S178).

The browser 80 of the PC 60 obtains the information 190 from the printer 10. When the current print condition data 182 is included in the information 190, the browser 80 instructs the print manager 78 to register the current print condition data 182 (S200). Specifically, the browser 80 sends a registration command 410 including the current print condition data 182 to the print manager 78. Upon obtaining the registration command 410, the print manager 78 registers the current print condition data 182 included in the registration command 410 in the non-volatile memory 70 (S202). When the print condition data 74 is already registered in the memory 70, in S202, the print manager 78 newly registers the current print condition data 182 in place of the print condition data 74. In other words, the print manager 78 erases the print condition data 74 from the memory 70 and newly stores current print condition data 182 in the memory 70.

Moreover, processes performed by the PC 60 in accordance with the job requirement command 200 (S82, S84, S86), the print process performed by the printer 10 (S88), and subsequent processes (refer to S90 and S92 in FIG. 3) are the same as in the first embodiment.

The second embodiment has been described in detail. According to the present embodiment, the printer 10 returns the current print condition data 182 to the PC 60 so that the current print condition data 182 is registered in the PC 60 (S170 in FIG. 7). In the present embodiment, since the current print condition data 182 is registered in the PC 60 unlike the first embodiment, the printer 10 need not register the current print condition data 182. Therefore, the amount of data to be stored by the printer 10 whose non-volatile memory 20 has a relatively small capacity can be reduced.

The printer 10 obtains the print condition data 400 registered in the PC 60 and supplies the setting page data representing the setting page 300 in which a print condition indicated by the print condition data 400 is described to the PC 60 (S154, S158 in FIG. 8). Therefore, the user of the PC 60 can set a print condition to be used for the print at this time while referring to the print condition previously set by the user. In addition, the current print condition data 182 indicating the print condition set by the user upon the print at this time is registered in the PC 60 in place of the print condition data 400 (S202). Consequently, print condition data used in the latest print can be registered in the PC 60.

When the registration information 184 indicating the registration of the current print condition data 182 is obtained (if YES in S172 in FIG. 9), the printer 10 returns the current print condition data 182 to the PC 60, and when registration information 184 indicating the registration of the current print condition data 182 is not obtained (if NO in S172 in FIG. 9), the printer 10 does not return the current print condition data 182 to the PC 60. That is, the printer 10 can determine whether or not to register the current print condition data 182 in the PC 60 according to contents of the registration information 184 from the PC 60. In other words, the printer 10 is capable of determining whether or not to register the current print condition data 182 in the PC 60 according to the intention of the user of the PC 60 regarding registration of the current print condition data 182.

Moreover, in the present, embodiment, the print condition data 400 (the print condition data 74 in FIG. 1) is an example of "registered print condition data". The print condition indicated by the print condition data 400 (the print condition described in S154 in HQ 8) is an example of a "third print condition". In addition, the registration information 184 indicating "YES" is an example of "information indicating a registration of the current print condition data".

Modifications of the foregoing embodiments will be listed below.

(1) In the foregoing embodiments, the respective pieces of information 160, 170, 180, 190, 200, 220, and 230 communicated between the printer 10 and the PC 60 are directly exchanged. However, when a mediation server is interposed between the printer 10 and the PC 60, the information may be indirectly exchanged via the mediation server.

(2) In the foregoing embodiments, the setting page 300 includes both the setting field 302 and the print button 306. However, e.g., the printer 10 may supply first page data representing a first web page which includes the setting field 302 but not the print button 306 to the PC 60, and after obtaining the current print condition data indicating the print condition set by the user on the first web page, the printer 10 may supply second page data representing a second web page which does not include the setting field 302 but includes the print button 306 to the PC 60. In other words in a more generalized manner, while a single web page (the setting page 300) is represented by print instruction screen data and print setting screen data in the foregoing embodiments, the print instruction screen data may represent a single web page and the print setting screen data may represent a different single web page. In this case, the printer 10 may supply the print setting screen data to the terminal device before supplying the print instruction screen data. The printer 10 may supply the print instruction screen data to the terminal device after obtaining the current print condition data.

(3) In the foregoing embodiments, the part print condition data 202 indicates contents of the three setting items of color, resolution, and paper size. However, the pert print condition data 202 may alternatively indicate contents of only one or two setting items among the three setting items of color, resolution, and paper size. Alternatively, the part print condition data 202 may indicate contents of four (e.g., to additionally include document orientation) or more setting items.

(4) The printer 10 may additionally include a scanner function, a facsimile function, a phone function, an e-mail function, or the like. In other words, generally speaking, a "printer" is to encompass a multi-function device, that is a peripheral device of a PC.

(5) In the foregoing embodiment, respective units 32 to 44 are realized as a result of the controlling unit 30 performing the processes according to the program 26. Nevertheless, at least one unit of respective units 32 to 44 may alternately be realized by a hardware resource such as a logic circuit. Similar to this, at least one unit of respective units 92 to 98 may alternately be realized by a hardware resource such as a logic circuit.

The invention claimed is:

1. A printer configured to be connected with a terminal device via a network, the printer comprising:
   a print performing unit; and
   a processor configured to execute processes comprising:
   supplying print instruction screen data to the terminal device by using a first port number as a destination port number, the print instruction screen data being capable of being interpreted by a web browser of the terminal device, the print instruction screen data representing a print instruction screen which includes an instruction button for instructing the printer to perform a print, the first port number being a port number assigned to the web browser of the terminal device;
   obtaining selection information from the terminal device, the selection information being supplied from the terminal device to the printer when the instruction button in the print instruction screen is selected;
   sending by using a second port number as a destination port number, when the selection information is obtained from the terminal device, a requirement to the terminal device requiring the terminal device to supply target data of a print target, the second port number being different from the first port number, the second port number being a port number assigned to a specific software of the terminal device which is different from the web browser;
   obtaining the target data supplied from the terminal device in accordance with the requirement; and
   causing the print performing unit to print an image represented by the target data.

2. The printer as in claim 1, wherein
   the supplying comprises further supplying print setting screen data to the terminal device, the print setting screen data capable of being interpreted by the web browser of the terminal device, the print setting screen data representing a print setting screen which includes a setting field for setting a print condition of the printer,
   the processor is further configured to execute processes comprising:
   obtaining, from the terminal device, current print condition data indicating a first print condition set by the user on the print setting screen,
   wherein the causing comprises causing the print performing unit to print the image represented by the target data in accordance with the first print condition indicated by the current print condition data.

3. The printer as in claim 2, wherein
the sending of the requirement comprises supplying, to the terminal device when making the requirement, partial print condition data indicating at least a part of contents of a plurality of setting items included in the first print condition, such that the terminal device creates the target data from original data in accordance with the part of the contents of the plurality of setting items.

4. The printer as in claim 2, wherein
the obtaining of the current print condition data comprises registering an association of the current print condition data and identification information of the terminal device in a nonvolatile memory if a registration of the current print condition data is instructed from the terminal device, and
the current print condition data is not registered in the non-volatile memory if the registration of the current print condition data is not instructed from the terminal device.

5. The printer as in claim 4, wherein
the processor is further configured to execute processes comprising:
obtaining the identification information of the terminal device from the terminal device before the print setting screen data is supplied to the terminal device, wherein in a case where specific print condition data associated with the obtained identification information is registered in the non-volatile memory, the supplying comprises supplying, to the terminal device, the print setting screen data in which a second print condition indicated by the specific print condition data is described.

6. The printer as in claim 2, wherein
the processor is further configured to execute processes comprising:
returning, after the current print condition data is obtained from the terminal device, the obtained current print condition data to the terminal device, such that the obtained current print condition data is registered in the terminal device.

7. The printer as in claim 6, wherein
the processor is further configured to execute processes comprising:
obtaining registered print condition data from the terminal device before the print setting screen data is supplied to the terminal device, the registered print condition data being print condition data which has been registered in the terminal device,
wherein the supplying comprises supplying, to the terminal device, the print setting screen data in which a third print condition indicated by the registered print condition data is described, and
the returning comprises returning, after the current print condition data is obtained from the terminal device, the obtained current print condition data to the terminal device, such that the obtained current print condition data is registered in the terminal device in place of the registered print condition data.

8. The printer as in claim 6, wherein
the returning comprises returning the current print condition data to the terminal device if information indicating a registration of the current print condition data is obtained from the terminal device, and
the current print condition data is not returned to the terminal device if the information indicating the registration of the current print condition data is not obtained from the terminal device.

9. The printer as in claim 1, wherein
the supplying comprises supplying status screen data to the terminal device in the case where the selection information is obtained from the terminal device, the status screen data being capable of being interpreted by the web browser of the terminal device, the status screen data representing a status screen which indicates a print situation of the printer.

10. A terminal device configured to be connected with a printer via a network, the terminal device comprising:
a processor configured to execute processes comprising:
obtaining print instruction screen data from the printer, the print instruction screen data being capable of being interpreted by a web browser of the terminal device, the print instruction screen data representing a print instruction screen which includes an instruction button for instructing the printer to perform a print, wherein a function of the obtaining of the print instruction screen data is realized by the web browser of the terminal device, the print instruction screen data is supplied from the printer by using a first port number as a destination port number, and the first port number is a port number assigned to the web browser of the terminal device;
supplying selection information to the printer when the instruction button in the print instruction screen is selected;
receiving, from the printer, after the selection information is supplied to the printer, a requirement requiring the terminal device to supply target data of a print target, wherein a function of the obtaining of the requirement is realized by a specific software of the terminal device which is different from the web browser, the requirement is supplied from the printer by using a second port number which is different from the first port number, and the second port number is a port number assigned to the specific software; and
supplying the target data to the printer in accordance with the requirement.

11. A non-transitory computer-readable storage medium storing a computer program for a printer configured to be connected with a terminal device via a network, the computer program including instructions for ordering a computer mounted on the printer to perform:
supplying print instruction screen data to the terminal device by using a first port number as a destination port number, the print instruction screen data being capable of being interpreted by a web browser of the terminal device, the print instruction screen data representing a print instruction screen which includes an instruction button for instructing the printer to perform a print, the first port number being a port number assigned to the web browser of the terminal device;
obtaining selection information from the terminal device, the selection information being supplied from the terminal device to the printer when the instruction button in the print instruction screen is selected;
sending by using a second port number as a destination port number, when the selection information is obtained from the terminal device, a requirement to the terminal device that requires the terminal device to supply target data of a print target, the second port number being different from the first port number, the second port number being a port number assigned to a specific software of the terminal device which is different from the web browser;
obtaining the target data supplied from the terminal device in accordance with the requirement; and causing a print performing unit to print an image represented by the target data.

12. A non-transitory computer-readable storage medium storing a computer program for a terminal device configured to be connected with a printer via a network, the computer program including instructions for ordering a computer mounted on the terminal device to perform:

obtaining print instruction screen data from the printer, the print instruction screen data being capable of being interpreted by a web browser of the terminal device, the print instruction screen data representing a print instruction screen which includes an instruction button for instructing the printer to perform a print, wherein a function of the obtaining of the print instruction screen data is realized by the web browser of the terminal device, the print instruction screen data is supplied from the printer by using a first port number as a destination port number, and the first port number is a port number assigned to the web browser of the terminal device;

supplying selection information to the printer when the instruction button in the instruction screen is selected;

receiving, from the printer, after the selection information is supplied to the printer, a requirement requiring the terminal device to supply target data of a print target, wherein a function of the obtaining of the requirement is realized by a specific software of the terminal device which is different from the web browser, the requirement is supplied from the printer by using a second port number which is different from the first port number, and the second port number is a port number assigned to the specific software; and supplying the target data to the printer in accordance with the requirement.

* * * * *